(12) United States Patent
Moore et al.

(10) Patent No.: US 8,175,377 B2
(45) Date of Patent: May 8, 2012

(54) METHOD AND SYSTEM FOR TRAINING CLASSIFICATION AND EXTRACTION ENGINE IN AN IMAGING SOLUTION

(75) Inventors: John A. Moore, Victor, NY (US); Matthew Coene, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 485 days.

(21) Appl. No.: 12/495,069

(22) Filed: Jun. 30, 2009

(65) Prior Publication Data
US 2010/0329545 A1 Dec. 30, 2010

(51) Int. Cl.
*G06K 9/62* (2006.01)
(52) U.S. Cl. .......................... 382/159; 382/224
(58) Field of Classification Search .......................... None
See application file for complete search history.

(56) References Cited

U.S. PATENT DOCUMENTS

| | | | | |
|---|---|---|---|---|
| 5,416,611 A | 5/1995 | Tandon | | 358/474 |
| 5,625,767 A * | 4/1997 | Bartell et al. | | 345/440 |
| 7,526,137 B2 | 4/2009 | Ishizaka | | 382/254 |
| 2003/0023575 A1 * | 1/2003 | Shlain et al. | | 706/52 |
| 2004/0083270 A1 * | 4/2004 | Heckerman et al. | | 709/207 |
| 2004/1021285 | 10/2004 | Hosier et al. | | 358/510 |
| 2005/0060643 A1 * | 3/2005 | Glass et al. | | 715/501.1 |
| 2005/0071759 A1 | 3/2005 | Connors et al. | | 715/517 |
| 2006/0095524 A1 * | 5/2006 | Kay et al. | | 709/206 |
| 2007/0094217 A1 * | 4/2007 | Ronnewinkel | | 706/52 |
| 2007/0300302 A1 * | 12/2007 | Morin et al. | | 726/23 |
| 2008/0056575 A1 * | 3/2008 | Behm et al. | | 382/180 |
| 2008/0144068 A1 | 6/2008 | Digby | | 358/1.13 |
| 2010/0250537 A1 * | 9/2010 | Van De Par | | 707/737 |

* cited by examiner

*Primary Examiner* — Brian P Werner
(74) *Attorney, Agent, or Firm* — Kermit D. Lopez; Luis M. Ortiz; Kevin Soules

(57) ABSTRACT

A method and system for automatically training a document imaging classification and extraction system that switches between a manual mode and an automatic mode based on constant monitoring. A specialized sub-system monitors and records a user interaction with the classification system during the initial manual mode and, in parallel, develops and tests a user configuration with respect to an automated processing engine. The system is capable of being shifted to the automatic mode if a desired acceptability threshold is attained and the document can then be processed automatically. Furthermore, a user can interact with the classification system if the automatic mode fails. Information concerning exception handling can be entered into a training database for continual refinement of the classification and extraction system.

19 Claims, 3 Drawing Sheets

METHOD AND SYSTEM FOR TRAINING CLASSIFICATION AND EXTRACTION ENGINE IN AN IMAGING SOLUTION

TECHNICAL FIELD

Embodiments are generally related to document management systems and methods. Embodiments also relate in general to the field of computers and similar technologies and in particular to software utilized in this field. Embodiments are additionally related to document imaging classification and extraction methods and systems.

BACKGROUND OF THE INVENTION

Document imaging is a process of scanning a paper document and converting the document to a digital image which is then stored via a magnetic storage device. Such document imaging processes provide the ability to perform an optical character recognition (OCR) for the translation of images of text such as scanned documents, into actual text characters. Classification is an important feature with respect to document image processing and is often a preliminary step towards recognition, understanding, and information extraction.

The majority of prior art techniques for classifying documents are both time consuming and labor intensive. Typically, the documents are processed manually and the classification of the document imaging requires training via a representative sample image to perform complex mathematical analysis, which cluster or classify documents that are similar to one another. Such techniques require significant training and technical resources. Furthermore, such approaches may not cover every classification/extraction scenario and are particularly limited by the representative samples provided.

Based on the foregoing, it is believed that a need exists for an improved method for automatically training a document imaging classification and extraction system. A need also exists for automatically switching between a manual mode and an automatic mode based on constant monitoring, as described in greater detailed herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system, and computer-usable medium.

It is another aspect of the present invention to provide for an improved method for automatically training a document imaging classification and extraction system.

It is a further aspect of the present invention to provide for an improved method and system for automatically switching between a manual mode and an automatic mode based on constant monitoring.

It is yet another aspect of the present invention to provide for an improved method for the continual refinement of a document imaging classification and extraction system.

The aforementioned aspects and other objectives and advantages can now be achieved as described herein. A method and system for automatically training a document imaging classification and extraction system that switches between a manual mode and an automatic mode based on constant monitoring is disclosed. A specialized sub-system monitors and records a user interaction with the classification system during the initial manual mode and in parallel, develops and tests a user configuration for an automated processing engine. The system can be automatically shifted to the automatic mode, if a desired acceptability threshold is achieved, and the document can be processed automatically. Furthermore, the user can interact with the classification system if the automatic mode fails. Information with respect to such exception handling can be inputted into a training database for continual refinement of the automated classification and extraction system.

If the quality of incoming documents changes significantly, the sub-system can switch back to the manual mode by effectively rebooting the system until the acceptability threshold value is reached again. User actions, along with copies of the actual images, can be independently recorded in the training database, thereby allowing ground-truth data to be gathered over time while "real" work is being accomplished. The data generally includes information such as region-of-interest (x, y coordinates) based on a user's zoom and other actions related to a particular metadata field. Notifications indicative of health and performance of the system can be generated in the form of one or more reminders when the classification system begins operations. Such an approach provides for automatic switching between the manual and automated phases based on constant monitoring.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
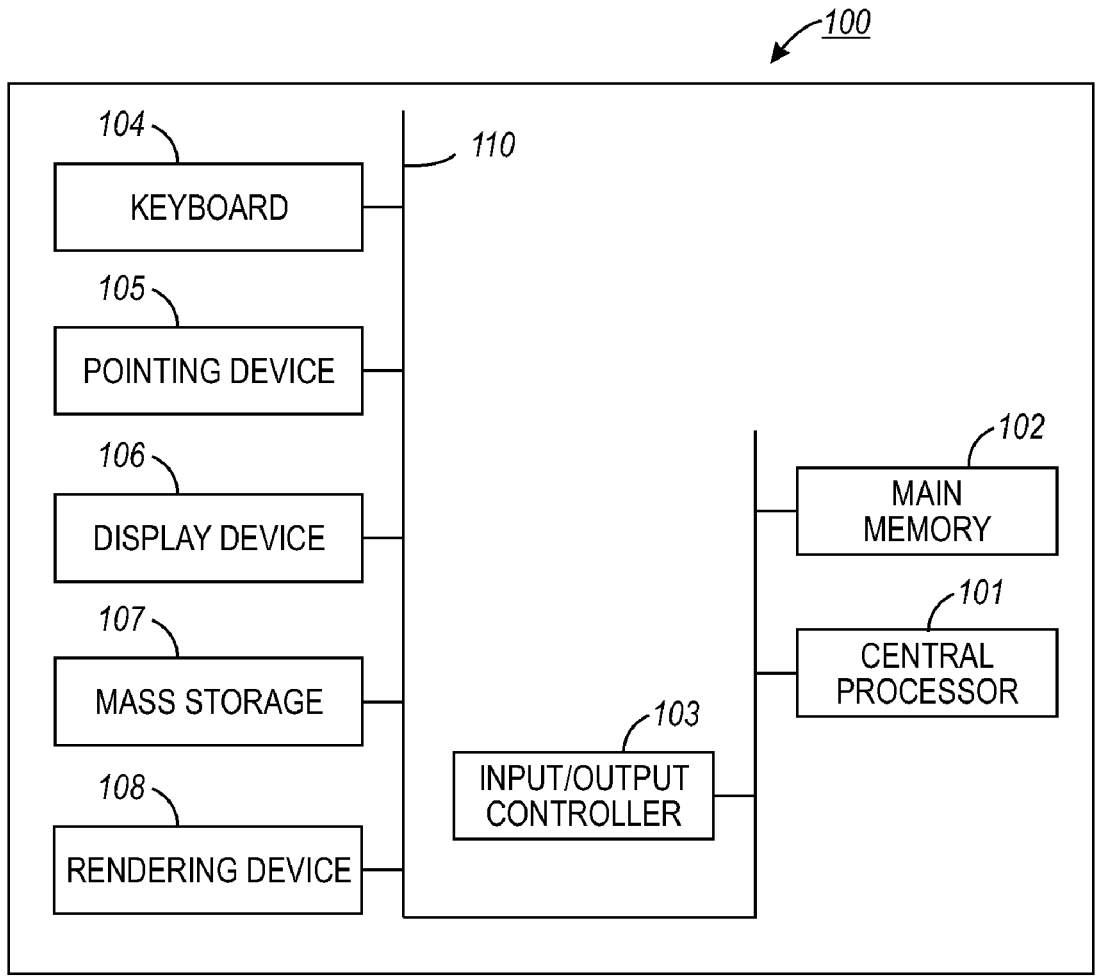
FIG. 1 illustrates a schematic view of a computer system in which the present invention may be embodied.

As depicted in FIG. 1, the present invention may be embodied in the context of a data-processing apparatus 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in association with the data-processing apparatus 100 as desired. The rendering device 108 may be a standalone single function device such as a dedicated printer, scanner, copy machine, etc, or may be an apparatus such as an MFD (multifunction device). As illustrated, the various components of the data-processing apparatus 100 communicate through a system bus 110 or similar architecture.

Figure 2:
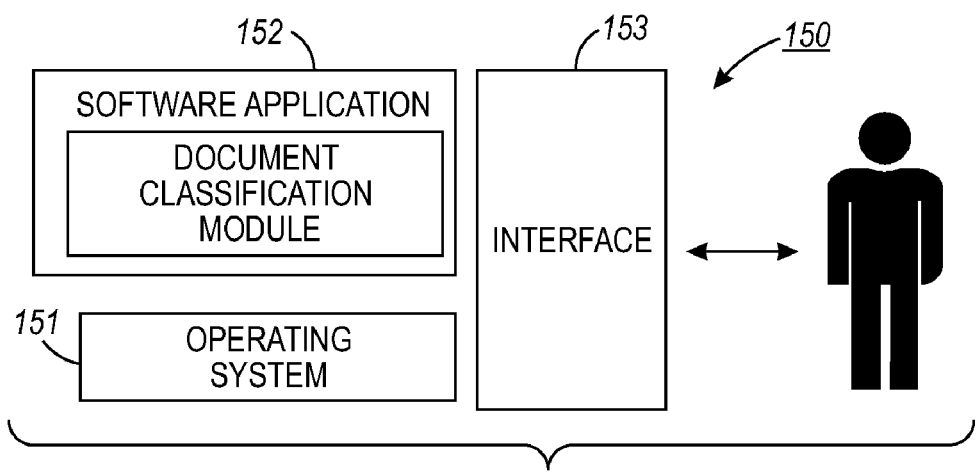
FIG. 2 illustrates a schematic view of a software system including an operating system, application software, and a user interface for carrying out the present invention.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. A user 325 may interact with the computer software system 150 via such an interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. Module 152 can be adapted for automatically training a document imaging classification and extraction system. Module 152 can be adapted for automatically switching between a manual mode and an automatic mode based on constant monitoring. Application module 152, on the other hand, can include instructions such as the various operations described herein with respect to the various components and modules described herein such as, for example, the method 400 depicted in FIG. 4.

The following description is presented with respect to embodiments of the present invention, which can be embodied in the context of a data-processing system such as data-processing apparatus 100 and computer software system 150 depicted respectively FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
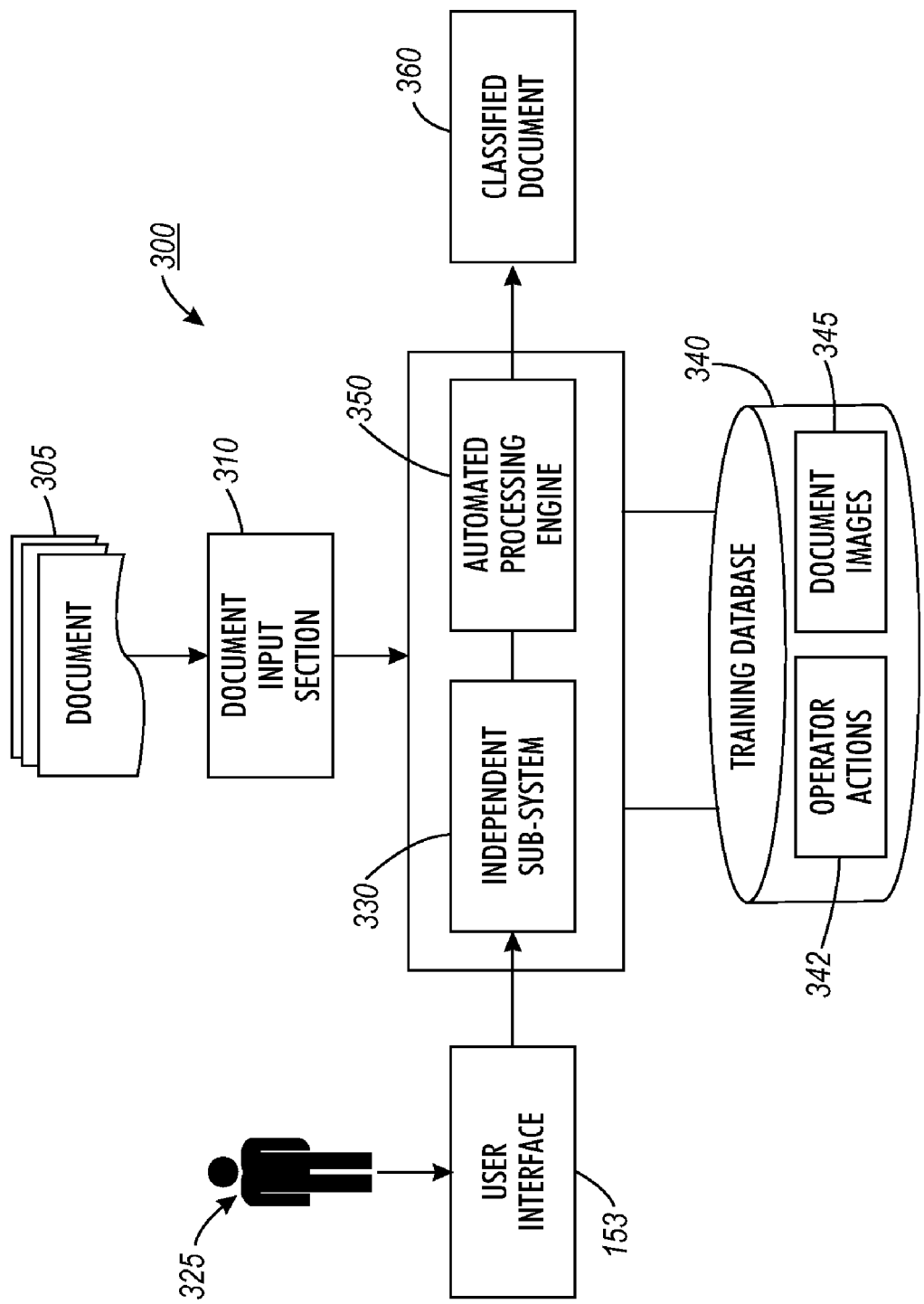
FIG. 3 illustrates a block diagram of a document imaging classification and extraction system, in accordance with an embodiment.

FIG. 3 illustrates a block diagram of a document imaging classification and extraction system 300, in accordance with an embodiment. In general, document image classification can be an important step in office automation, digital libraries, and other document image analysis applications. The document image classification can be processed by training the document image classification and extraction system 300 manually on document images. The system 300 can switch between a manual mode and an automatic mode based on constant monitoring. The document image classification system 300 includes a document input section 310, an independent sub-system 330, a training database 340 and an automated processing engine 350.

A document 305 that is to be classified can be received through the document input section 310. The input section 310 inputs the document data and is capable of obtaining documents and groups of documents via the keyboard 104, the rendering device 108 such as printers, scanners, photocopy machines, and the like comprising an OCR function. A document is a collection of one or more sentences written in a natural language, comprising letters, rows of letters, numbers, and the like, which are organized into a meaningful arrangement to form one document. Furthermore, a collection of multiple documents may be referred to as a document cluster.

A user 325 can manually classify the received document 305 through a user interface 153 by visual cross reference to an example set by following a manual indexing process in the manual mode. The user 325 can also extract metadata interactively by keying from the document image and/or utilizing "point and click" OCR (Optical Character Recognition) technology. Such OCR technology can be utilized for mechanical or electronic translation of images of handwritten, typewritten or printed text (e.g., usually captured by a scanner) into machine-editable text. The independent sub-system 330 monitors the actions of the user 325 with respect to the user interface 153. The actual document image 345 can be stored in the training database 340.

The user interface 153, which is preferably a graphical user interface (GUI), can serve to display results, whereupon the user 325 may supply additional inputs or terminate a given session. Note that the term "GUI" generally refers to a type of environment that represents programs, files, options and so forth by means of graphically displayed icons, menus, and dialog boxes on a computer monitor screen. A user can interact with the GUI 153 to select and activate such options by pointing and clicking with a user input device such as, for example, a pointing device such as a mouse, and/or with a keyboard. A particular item can function in the same manner to the user in all applications because the GUI 153 provides standard software routines (e.g., module 152) to handle these elements and reports the actions of the user 325.

The actions of the user 325 maybe, for example, actions such as a zoom to a particular region of interest (e.g., x, y coordinates), and actions related to a particular metadata field of the document image and the like. The sub-system 330 in parallel develops and tests a user configuration with respect to the automated processing engine 350. The sub-system 330 develops and tests the user classification and extraction models to determine if a minimum acceptability threshold has been attained. Note that as utilized herein, the term "metadata" generally refers to "data about data", or of any sort of data contained in any media. An item of metadata may describe an individual datum, or content item, or a collection of data including multiple content items and hierarchical levels, for example, a database schema Metadata may include descriptive information concerning the context, quality and condition, or characteristics of the data.

The system 300 can be automatically shifted to an automatic mode to generate a classified document 360 by the automatic process engine 350 if a desired acceptability threshold is achieved. Furthermore, the user 325 can interact with the classification system 300 in order to handle exception cases if the automatic techniques fail. The information with respect to the exception handling can be entered into the training database 340 for continual refinement of the automated classification and extraction system 300. The classified documents 360 are organized in a set of different classes, each class being representative of a given type of document, according to the definitions given manually.

Furthermore, if the quality or nature of the incoming documents changes significantly, the process can be switched back to the manual mode, effectively rebooting the system 300 until the acceptability threshold value is reached again. The training data can be gathered from the end-user documents and specific business process queue via transports such as fax, distributed scan from multi-function device, ftp (File Transfer Protocol), and web submission. Notifications indicative of the health and performance of the system 300 can be generated in the form of one or more reminders when the classification system 300 begins operations. Note that the system 300 can be a data processing system, such as data processing system 100 depicted in FIG. 1, and can include computer-implemented medium for automatically classifying the document 305 by switching between the manual mode and the automatic mode based on constant monitoring.

Figure 4:
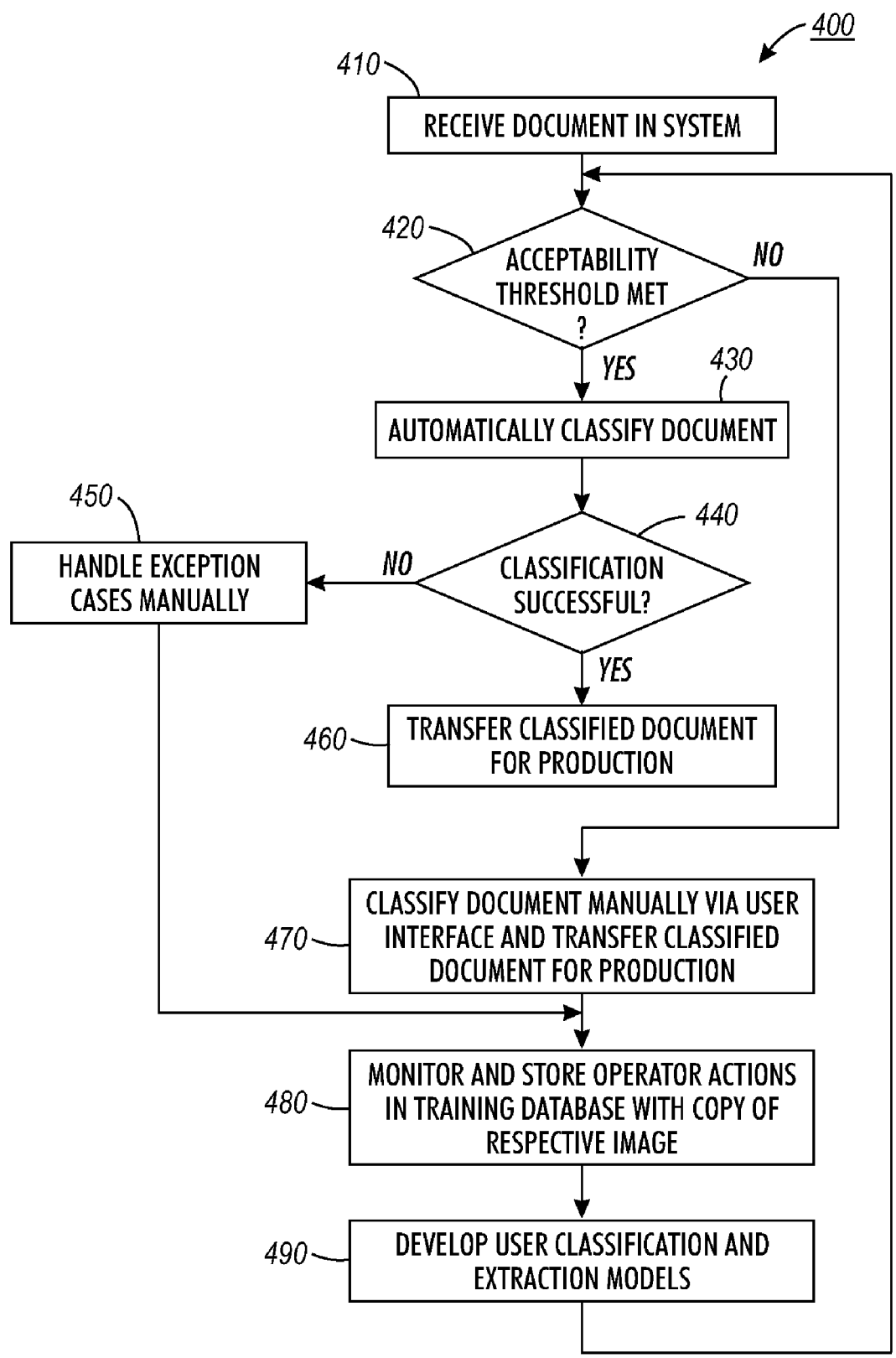
FIG. 4 illustrates a flow chart of operations illustrating logical operational steps of a method for automatically training a document imaging classification and extraction system that switches between a manual mode and an automatic mode, in accordance with an embodiment.

FIG. 4 illustrates a flow chart of operations illustrating logical operational steps of a method 400 for automatically training the document imaging classification and extraction system 300 to switch between the manual mode and the automatic mode based on constant monitoring, in accordance with an embodiment. Note that in FIGS. 1-4, identical or similar blocks are generally indicated by identical reference numerals. The document 305 to be classified can be received via the document input section 310, as illustrated at block 410. Thereafter, a determination can be made whether the acceptability threshold value is met, as depicted at the block 420.

If the acceptability threshold value is not met, the incoming document 305 can be manually classified by visual cross reference utilizing the user interface 153 and the classified document 360 can be transmitted for production, as illustrated at block 470. The user actions 342, while classifying the document 305, can be monitored and stored in the training database 340, as indicated at block 480. Simultaneously, the user classifications and extraction models can be developed by the independent sub-system 330, as indicated at block 490. If the acceptability threshold value is met, the automated processing engine 350 automatically classifies the incoming document 305, as indicated at block 430.

A determination can then be made whether the document 305 is classified successfully, as illustrated at block 440. If the document 305 is classified successfully, then the classified document 360 can be transmitted for production, as depicted at block 460. Otherwise, the classification exceptional cases can be handled manually, as indicated at block 450. Thereafter, the process can be continued from block 470. As required, detailed embodiments of the present invention are disclosed herein; however, it is to be understood that the disclosed embodiments are merely exemplary of the invention that may be embodied in various and alternative forms. The specific structural details disclosed herein are not to be interpreted as limiting, but merely as a representative basis for the claims and/or as a representative basis for teaching one skilled in the art to variously employ the present invention.

It is believed that by utilizing the system and approach described herein, the training and configuration steps typically required for the document imaging classification and extraction system 300 can be automated. The method 400 avoids the need for costly and time consuming training prior to classification and can also avoid specialized skills required to perform the training. Such an approach allows for continual cost savings over time as the automated process engine quality improves with constant refinement from operator feedback.

Programs defining functions on the present invention can be delivered to a data storage system or a computer system via a variety of signal-bearing media, which include, without limitation, non-writable storage media (e.g., COD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 400 described herein can be deployed as process software in the context of a computer system or data-processing system as that depicted in FIGS. 1-2.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for document imaging classification and extraction, said method comprising:
   receiving at least one document to be classified with a document input section;
   classifying said at least one document manually;
   recording a user interaction with respect to a classification unit for said at least one document in association with an image of said at least one document in a manual mode;
   automatically shifting a document to an automatic mode if an acceptable threshold limit is attained, based on a classification and extraction model, in response to receiving said document; and
   constantly monitoring said acceptable threshold to switch between said manual mode and said automatic mode.

2. The method of claim 1 further comprising processing said document automatically via an automated processing engine.

3. The method of claim 1 further comprising recording said user interaction in association with said image of said at least one document in a training database in a manual mode.

4. The method of claim 3 further comprising:
   developing said classification and extraction model from said user interaction; and
   testing said user classification and extraction model with respect to an automated processing engine.

5. The method of claim 3 further comprising:
   processing said document if said document is not processed successfully in said automatic mode; and
   entering information with respect to said document into said training database for a continual refinement of said classification unit.

6. The method of claim 1 further comprising automatically training said classification unit in order to switch between said manual mode and said automatic mode based on said constant monitoring.

7. The method of claim 1 further comprising configuring said classification unit to switch said document to said manual mode by rebooting said classification unit, if a quality associated with said document changes significantly until said acceptable threshold limit is again attained.

8. The method of claim 1 further comprising automatically displaying a representation indicative of a performance and health of said classification unit.

9. A system for document imaging classification and extraction, said system comprising:
   a processor;
   a data bus coupled to said processor; and
   a computer-usable medium embodying computer code, said computer-usable medium being coupled to said data bus, said computer program code comprising instructions executable by said processor and configured for:
      receiving at least one document to be classified with a document input section;
      classifying at least one document manually;
      recording a user interaction with respect to a classification unit for said at least one document in association with an image of said at least one document in a manual mode;
      automatically shifting a document to an automatic mode if an acceptable threshold limit is attained, based on a classification and extraction model, in response to receiving said document; and
      constantly monitoring said acceptable threshold to switch between said manual mode and said automatic mode.

10. The system of claim 9 wherein said instructions are further configured for processing said document automatically via an automated processing engine.

11. The system of claim 9 wherein said instructions are further configured for recording said user interaction in association with said image of said at least one document in a training database in a manual mode.

12. The system of claim 11 wherein said instructions are further configured for:
   developing said classification and extraction model from said user interaction; and
   testing said user classification and extraction model with respect to an automated processing engine.

13. The system of claim 11 wherein said instructions are further configured for:
   processing said document if said document is not processed successfully in said automatic mode; and
   entering information with respect to said document into said training database for a continual refinement of said classification unit.

14. The system of claim 9 wherein said instructions are further configured for automatically training said classification unit in order to switch between said manual mode and said automatic mode based on said constant monitoring.

15. A non-transitory computer-usable medium for document imaging classification and extraction, said non-transitory computer-usable medium embodying computer program code, said computer program code comprising computer executable instructions configured for:
   receiving at least one document to be classified with a document input section;
   classifying said at least one document manually;
   recording a user interaction with respect to a classification unit for said at least one document in association with an image of said at least one document in a manual mode;
   automatically shifting a document to an automatic mode if an acceptable threshold limit is attained, based on a classification and extraction model, in response to receiving said document; and
   constantly monitoring said acceptable threshold to switch between said manual mode and said automatic mode.

16. The non-transitory computer-usable medium of claim 15 wherein said embodied computer program code further comprises computer executable instructions configured for processing said document automatically via an automated processing engine.

17. The non-transitory computer-usable medium of claim 15 wherein said embodied computer program code further comprises computer executable instructions configured for recording said user interaction in association with said image of said at least one document in a training database in a manual mode.

18. The non-transitory computer-usable medium of claim 17 wherein said embodied computer program code further comprises computer executable instructions configured for:
   developing said classification and extraction model from said user interaction; and
   testing said user classification and extraction model with respect to an automated processing engine.

19. The non-transitory computer-usable medium of claim 17 wherein said embodied computer program code further comprises computer executable instructions configured for:
   processing said document if said document is not processed successfully in said automatic mode; and
   entering information with respect to said document into said training database for a continual refinement of said classification unit.

* * * * *